US008241398B2

(12) United States Patent
Berry et al.

(10) Patent No.: US 8,241,398 B2
(45) Date of Patent: Aug. 14, 2012

(54) METHOD AND APPARATUS FOR THE ENHANCED REMOVAL OF AEROSOLS AND VAPOR PHASE CONTAMINANTS FROM A GAS STREAM

(75) Inventors: Mark Simpson Berry, West Birmingham, AL (US); Ramsay Chang, Mountain View, CA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 12/765,281

(22) Filed: Apr. 22, 2010

(65) Prior Publication Data
US 2010/0202945 A1 Aug. 12, 2010

Related U.S. Application Data

(63) Continuation of application No. 11/855,375, filed on Sep. 14, 2007, now Pat. No. 7,731,781, which is a continuation-in-part of application No. 11/592,604, filed on Nov. 3, 2006, now Pat. No. 7,708,803.

(51) Int. Cl.
*B03C 3/76* (2006.01)
*B03C 3/78* (2006.01)
(52) U.S. Cl. .................. 95/74; 55/290; 55/293; 55/304; 95/75; 95/76; 95/281; 95/282; 96/32; 96/42; 96/44
(58) Field of Classification Search .............. 95/58, 116, 95/133, 134, 230, 234, 74–76, 281, 282; 96/55, 134, 135, 371, 32, 41, 42, 44, 50, 96/40; 55/341.1, 290, 293, 304, 305; 110/342, 110/345; 423/210, 215.5; 502/180
See application file for complete search history.

(56) References Cited

U.S. PATENT DOCUMENTS

| 2,067,303 | A | * | 1/1937 | Tennison | 96/287 |
| 2,486,877 | A | * | 11/1949 | Ransburg et al. | 96/42 |
| 2,593,377 | A | * | 4/1952 | Wintermute | 95/70 |
| 3,404,513 | A | * | 10/1968 | Roberts | 96/27 |
| 3,768,258 | A | * | 10/1973 | Smith et al. | 60/275 |
| 3,932,151 | A | * | 1/1976 | Lau | 96/325 |
| 4,049,399 | A | * | 9/1977 | Teller | 95/36 |
| 4,193,774 | A | * | 3/1980 | Pilat | 95/71 |
| 4,255,166 | A | * | 3/1981 | Gernand et al. | 95/27 |
| 4,445,281 | A | * | 5/1984 | Aigoo | 34/58 |

(Continued)

FOREIGN PATENT DOCUMENTS

CA 2082690 C * 6/1993

(Continued)

*Primary Examiner* — Richard L Chiesa
(74) *Attorney, Agent, or Firm* — Owens Tarabichi LLP

(57) ABSTRACT

The invention provides methods and apparatuses for removing aerosols and, in some cases, vapor phase contaminants, such as mercury, from a gas stream. One method is directed to the removal of additional aerosols from a gas stream from which aerosols have previously been removed by using a screen in combination with a primary aerosol collection device. Another method is directed to the removal of both aerosols and vapor phase contaminants by using a sorbent in combination with a screen. Another method is directed to the removal of vapor phase contaminants by using a catalyst to convert the contaminant to a form that is more easily removed from the gas stream and optionally injecting a chemical to increase the rate of conversion. The invention also provides various apparatuses for use in performing the various methods of the invention.

22 Claims, 11 Drawing Sheets

U.S. PATENT DOCUMENTS

| | | | |
|---|---|---|---|
| 4,544,542 A * | 10/1985 | Angevine et al. | 423/555 |
| 4,613,487 A * | 9/1986 | Yoon et al. | 423/244.05 |
| 4,969,934 A * | 11/1990 | Kusik et al. | 95/270 |
| 5,024,681 A * | 6/1991 | Chang | 95/70 |
| 5,158,580 A * | 10/1992 | Chang | 95/70 |
| 5,160,510 A * | 11/1992 | Steinbacher et al. | 95/64 |
| 5,217,511 A * | 6/1993 | Plaks et al. | 96/55 |
| 5,250,267 A * | 10/1993 | Johnson et al. | 422/168 |
| 5,336,299 A * | 8/1994 | Savell | 95/70 |
| 5,476,538 A * | 12/1995 | Nishio et al. | 95/70 |
| 5,505,766 A * | 4/1996 | Chang | 95/134 |
| 5,827,352 A * | 10/1998 | Altman et al. | 95/58 |
| 5,854,173 A * | 12/1998 | Chang et al. | 502/417 |
| 5,879,432 A * | 3/1999 | Morlec et al. | 95/114 |
| 5,948,143 A * | 9/1999 | Sjostrom et al. | 95/134 |
| 6,136,072 A * | 10/2000 | Sjostrom et al. | 95/134 |
| 6,185,934 B1 * | 2/2001 | Teboul | 60/297 |
| 6,451,094 B1 * | 9/2002 | Chang et al. | 95/901 |
| 6,468,489 B1 * | 10/2002 | Chang et al. | 423/239.1 |
| 6,514,315 B1 * | 2/2003 | Chang | 95/70 |
| 6,558,454 B1 * | 5/2003 | Chang et al. | 95/901 |
| 6,695,894 B2 * | 2/2004 | Chang et al. | 95/134 |
| 6,712,878 B2 * | 3/2004 | Chang et al. | 95/90 |
| 6,818,043 B1 * | 11/2004 | Chang et al. | 95/37 |
| 6,858,064 B2 * | 2/2005 | Bologa et al. | 95/65 |
| 6,878,192 B2 * | 4/2005 | Pasic | 96/66 |
| 6,895,875 B1 * | 5/2005 | Lissianski et al. | 110/345 |
| 6,905,534 B2 * | 6/2005 | Chang et al. | 96/55 |
| 6,953,494 B2 * | 10/2005 | Nelson, Jr. | 95/134 |
| 6,958,088 B1 * | 10/2005 | Moriyama | 96/39 |
| 6,981,456 B2 * | 1/2006 | Lissianski et al. | 110/345 |
| 7,048,779 B1 * | 5/2006 | Weyand et al. | 95/58 |
| 7,141,091 B2 * | 11/2006 | Chang | 95/58 |
| 7,297,185 B2 * | 11/2007 | Furuta et al. | 96/39 |
| 7,306,774 B2 * | 12/2007 | DeBerry | 423/210 |
| 7,600,479 B2 * | 10/2009 | Lissianski et al. | 110/345 |
| 7,641,718 B2 * | 1/2010 | Furuta et al. | 96/39 |
| 7,708,803 B2 * | 5/2010 | Berry et al. | 95/59 |
| 7,731,781 B2 * | 6/2010 | Berry et al. | 95/116 |
| 2004/0045437 A1 * | 3/2004 | Chang et al. | 95/134 |
| 2004/0118285 A1 * | 6/2004 | Kim et al. | 96/55 |
| 2004/0123622 A1 * | 7/2004 | Yuzawa et al. | 62/475 |
| 2005/0132880 A1 * | 6/2005 | Chang | 95/63 |
| 2005/0135981 A1 * | 6/2005 | Chang | 423/239.1 |
| 2006/0021554 A1 * | 2/2006 | Lissianski et al. | 110/345 |
| 2006/0029533 A1 * | 2/2006 | DeBerry | 423/210 |
| 2006/0162564 A1 * | 7/2006 | Paterson et al. | 96/55 |
| 2006/0186054 A1 * | 8/2006 | Webb et al. | 210/688 |
| 2008/0105120 A1 * | 5/2008 | Berry et al. | 95/70 |
| 2008/0105121 A1 * | 5/2008 | Chang | 95/70 |
| 2008/0115704 A1 * | 5/2008 | Berry et al. | 110/203 |

FOREIGN PATENT DOCUMENTS

| | | | |
|---|---|---|---|
| JP | 53-140675 | * 12/1978 | 96/55 |

* cited by examiner

METHOD AND APPARATUS FOR THE ENHANCED REMOVAL OF AEROSOLS AND VAPOR PHASE CONTAMINANTS FROM A GAS STREAM

CROSS-REFERENCE TO RELATED APPLICATION

This application is a continuation of prior U.S. patent application Ser. No. 11/855,375, filed Sep. 14, 2007, now U.S. Pat. No. 7,731,781, which is a continuation-in-part of prior U.S. patent application Ser. No. 11/592,604, filed Nov. 3, 2006, now U.S. Pat. No. 7,708,803, each of which is incorporated by reference herein in its entirety.

BACKGROUND

1. Background of the Invention

The invention relates generally to the enhanced removal of aerosols, such as fine liquid droplets and particulate matter, from a gas stream. More specifically, the invention is directed to the removal of aerosols, and in some embodiments additionally a vapor phase contaminant, from the flue gas of a combustion system.

2. Description of Related Art

The emission of aerosols, such as particulate matter or fly ash and acid mist, from flue gas generated by utility power plants is an important issue. Several technologies have been used to remove such aerosols from the flue gas before its release to the atmosphere, including wet and dry electrostatic precipitators, wet and dry scrubbers, and baghouses. However, these existing collectors are required to handle even higher amounts of aerosols as more materials such as sorbents for mercury and acid gas control are being intentionally injected into the flue gas stream and because new pollution control devices, such as selective reduction (SCR) catalysts, increase sulfuric acid mist formation in the flue gas. Otherwise, such increased aerosol loadings lead to increased particulate and acid mist emissions at the stack. In addition, environmental regulations are becoming increasingly more stringent, requiring power plants to reduce stack aerosol emissions even further. Therefore, it is desirable to improve and enhance the methods and equipment currently used for removing aerosols, including particulate matter or fly ash and acid mists, from gas streams. In particular, there is a need for methods and apparatuses or "polishers" that supplement the removal of particulate matter or fly ash obtained using traditional equipment.

Further, special attention has been given to emissions of vaporous trace contaminants, such as mercury (Hg), in flue gas generated by utility power plants and the impact such trace contaminants may have on the environment. Generally, trace contaminants include those vaporous chemical species present in relatively low concentrations in a given gas stream. For example, mercury is present in flue gas from a fossil-fuel-fired combustion system in very low concentrations (<1 ppm) and is present in a number of volatile compounds that are difficult to remove. Specially designed and costly emissions-control systems are required to effectively capture these trace amounts of mercury. Therefore, there is also a need to improve the methods and equipment used for removing such vaporous trace contaminants from gas streams.

SUMMARY OF THE INVENTION

The invention provides methods and apparatuses for removing additional aerosols and in some cases additional particulate matter from a gas stream, wherein a certain portion of such aerosols and particulate matter has already been removed using a primary aerosol and particulate collection device. In effect, the methods and apparatuses of the invention provide a way to polish a gas stream.

In some embodiments, the invention comprises a method for removing additional aerosols from a gas stream that has aerosols previously removed by a primary aerosol collector, comprising passing a gas stream comprising a plurality of aerosols through a gas duct; removing a first portion of the plurality of said aerosols using a primary aerosol collector; passing the gas stream through a screen; and collecting at least a second portion of the plurality of aerosols on the screen.

In other embodiments, the invention provides a method for removing additional aerosols from a gas stream that has aerosols previously removed by a primary aerosol collector further comprising removing a portion of said vapor phase contaminant using a sorbent disposed on the screen or using a screen constructed from a sorbent. In other embodiments, the invention provides a method for removing additional aerosols from a gas stream that has aerosols previously removed by a primary aerosol collector further comprising passing one portion of the screen out of the gas duct; regenerating the sorbent on that portion of the screen while another portion of the screen is in use; and returning the regenerated portion of the screen back into the gas duct and into contact with the gas stream. In other embodiments, the screen may be electrically charged to enhance the removal of aerosol particles and particulate matter.

In other embodiments, the invention provides a method for converting a vapor phase contaminant into a form that is more easily removed from the gas stream by injecting a catalyst into the gas stream to catalyze the conversion reaction. In one embodiment, the invention provides a method for converting a vapor phase contaminant in a gas stream to a form that is more easily removed from the gas stream comprising injecting a catalyst into a gas stream comprising vapor phase contaminant; collecting at least a portion of the catalyst from the gas stream to produce collected catalyst; contacting the gas stream and the collected catalyst; and converting at least a portion of the vapor phase contaminant into a converted form that is more easily removed from the gas stream, wherein the converting is catalyzed by at least a portion of the collected catalyst.

For example, in one embodiment, the invention provides a method for converting vaporous elemental mercury to a vaporous oxidized form of mercury, comprising injecting a catalyst powder into a gas stream comprising vaporous elemental mercury; collecting at least a portion of the catalyst powder to produce collected catalyst powder; contacting the gas stream and the collected catalyst; and converting at least a portion of the vaporous elemental mercury into a form of oxidized mercury, wherein said converting is catalyzed by at least a portion of the collected catalyst powder. In some embodiments, the catalyst powder is collected using an aerosol collection device, and in other embodiments, the catalyst powder is collected using a polisher.

In other embodiments, the invention provides a method for removing a vapor phase contaminant from a gas stream by converting the vapor phase contaminant into a form that is more easily removed from the gas stream by injecting a catalyst into the gas stream to catalyze the conversion reaction and subsequently removing the vapor phase contaminant in its new form from the gas stream. In one embodiment, the invention provides a method for removing a vapor phase contaminant from a gas stream, comprising injecting a catalyst into a gas stream comprising a vapor phase contaminant; collecting at least a portion of the catalyst to produce collected catalyst; contacting the gas stream and the collected catalyst; converting at least a portion of the a vapor phase contaminant into a converted form that is more easily removed from the gas stream, wherein the converting is catalyzed by at least a portion of the collected catalyst; and removing at least a portion of the converted form from the gas stream.

For example, in one embodiment, the invention provides a method for removing mercury from a gas stream, comprising injecting a catalyst powder into a gas stream comprising vaporous elemental mercury; collecting at least a portion of the catalyst powder to produce collected catalyst powder; contacting the gas stream and the collected catalyst powder; converting at least a portion of the vaporous elemental mercury into a form of oxidized mercury, wherein said converting is catalyzed by at least a portion of the collected catalyst powder; and collecting the oxidized mercury. In some embodiments, the catalyst powder is collected using an aerosol collection device, and in other embodiments, the catalyst powder is collected using a polisher.

In another embodiment, the invention provides a method for removing a vapor phase contaminant from a flue gas stream from a coal-fired boiler. In this embodiment, the catalyst is unburnt carbon generated by causing the coal-fired boiler to produce a certain amount of unburnt carbon. In this case, the injection of additional carbon according to other embodiments may be reduced or eliminated.

The invention also provides various apparatuses for use in performing the method of the invention. Other embodiments and features of the invention are described in more detail below in connection with the Figures.

DETAILED DESCRIPTION OF THE INVENTION

Generally, the invention comprises various methods and apparatuses for removing aerosols from a gas stream. It should be appreciated that the term "aerosol" is utilized in the broadest sense and includes, in addition to solid particles, liquid aerosols such as liquid droplets or mist (e.g., condensed $SO_3$ or sulfuric acid mist) in a gas stream. Further, the liquid aerosols may also be referred to as aerosol particles.

In some embodiments, the invention comprises methods to polish a gas stream and apparatuses that can be used as polishers with respect to the removal of aerosols and with respect to particulate matter from a gas stream. For example, in some embodiments, the methods and apparatuses of the invention are used downstream of a primary aerosol collector that removes a certain amount of aerosols and particulate matter from a gas stream. For example, the primary aerosol collector may be a typical particulate collection device that removes a significant portion of aerosols and particulate matter from the gas stream. The polishing methods and apparatuses are then used to remove additional aerosols and particulate matter that is not removed by the upstream aerosol collection device, thereby "polishing" the gas stream. In other embodiments of the invention, the removal of aerosols is combined not only with the removal of particulate matter but also with the removal of one or more vapor phase contaminants, such as vaporous trace metal contaminants, including, for example, mercury (Hg).

The following describes these and other exemplary embodiments of the present invention in conjunction with the accompanying drawings, wherein like reference numbers refer to similar structure or features. It should be appreciated, however, that the drawings are not intended to be drawn to scale. Further, the following descriptions are not intended to be limiting and are only exemplary embodiments of the present invention. It will be apparent to one of skill in the art that certain modifications may be made to the various exemplary embodiments as described. Such modifications are intended to be within the scope of the present invention.

FIG. 1 illustrates a combustion process in which various embodiments of the present invention may be utilized. As shown, a combustion process 100 comprises a combustion device 102, such as a fossil-fuel-fired boiler, that uses air to combust fuel, such as a fossil fuel, for example, coal. The combustion device 102 produces a gas stream in the form of flue gas that exits the combustion device 102 through a combustion device outlet duct 104. The flue gas produced within the combustion device 102 is comprised of air; gaseous products of combustion, such as water vapor, carbon dioxide, oxides of nitrogen and sulfur, halides, organic compounds, mercury, selenium, and other trace metal vapors; and aerosols, including particulate matter or fly ash and in some cases sulfuric acid mist. A primary aerosol collection device 106, such as a particulate collection device (e.g., a wet or dry electrostatic precipitator or a baghouse), is connected to the combustion device outlet duct 104 and removes aerosols and particulate matter from the flue gas. The flue gas then passes from the primary aerosol collection device 106 through an aerosol collection device outlet duct 108 either directly to a stack 114 (as shown by the dashed line) where the flue gas is discharged to the atmosphere or optionally through a scrubber 110, such as a wet scrubber, through a scrubber outlet duct 112, and then to the stack 114. It should be appreciated that this process is only exemplary, and the methods and apparatuses of the present invention generally may be used in connection with any gas stream in any process.

It should be appreciated that the aerosol collection device may be referred to as a "primary" aerosol collection device, which refers to an aerosol collection device that removes the most aerosols from the gas stream downstream of the combustion device relative to any other device in a given process, including, for example, the apparatuses of the present invention. For example, construing the combustion device 102 in FIG. 1 as a coal-fired boiler, the aerosol collection device 106 removes most of the aerosol generated by the coal-fired boiler relative to any other device in the process and, therefore, may be referred to as a primary aerosol collection device. Although, in the case where the scrubber 110 is also utilized, the aerosol collection device 106 is most likely still a primary aerosol collection device as it will remove more aerosol and fly ash than the scrubber 110, even though the scrubber 110 may also remove some fly ash. It should also be appreciated that the aerosol collection device is intended to encompass particulate collection devices as well, such as an electrostatic precipitator or baghouse. Accordingly, the aerosol collection device 106 in FIG. 1 may also function to remove a significant portion of particulate matter or fly ash.

Figure 1:
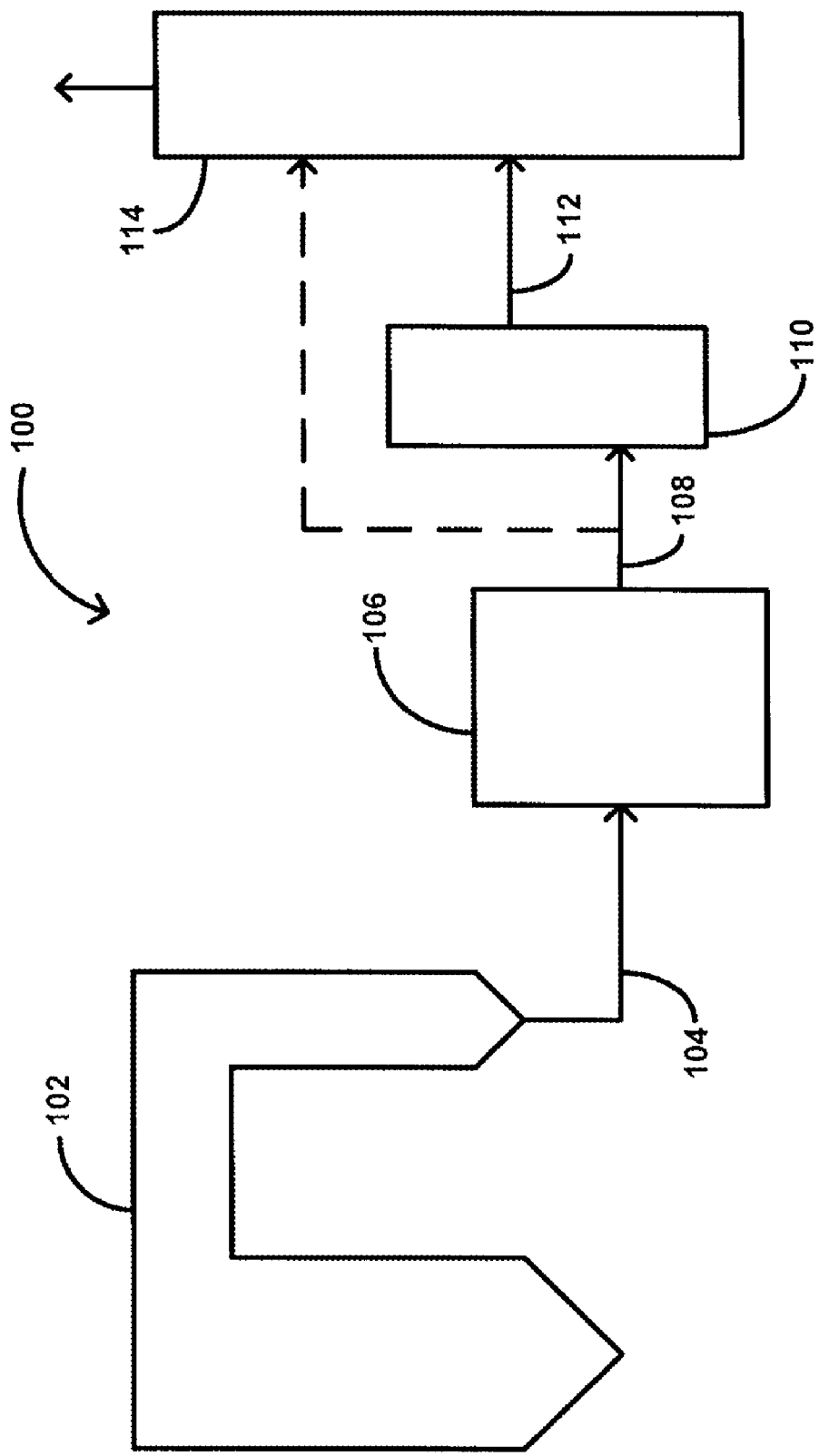
FIG. 1 illustrates a combustion process in which various embodiments of the present invention may be utilized.
Figure 2:
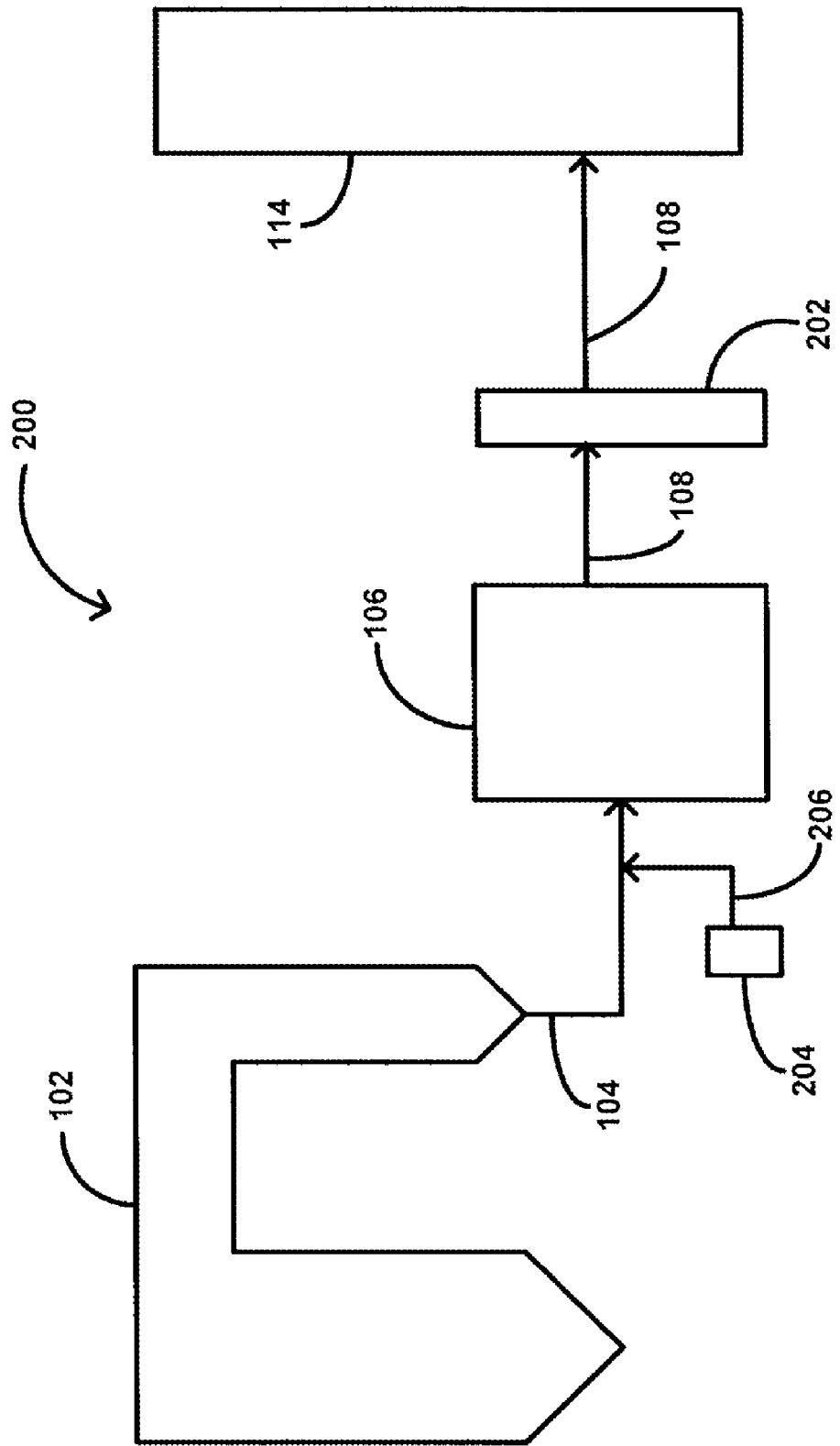
FIG. 2 illustrates a combustion process that incorporates one embodiment of the present invention.

FIG. 2 illustrates a combustion process that incorporates one embodiment of the present invention. As shown, the combustion process 200 is similar to the combustion process shown in FIG. 1 but without a scrubber positioned between the aerosol collection device 106 and the stack 114. In this process 200, the aerosol collection device 106 may be referred to as a primary aerosol collection device and may be any type of aerosol collection device, including, for example, a wet or dry electrostatic precipitator or a baghouse. A polisher 202, made according to one embodiment of the present invention, is positioned downstream of the primary aerosol collection device 106. It should be appreciated that in this FIG. 2, the polisher 202 is simply represented graphically by a box.

Figure 3:
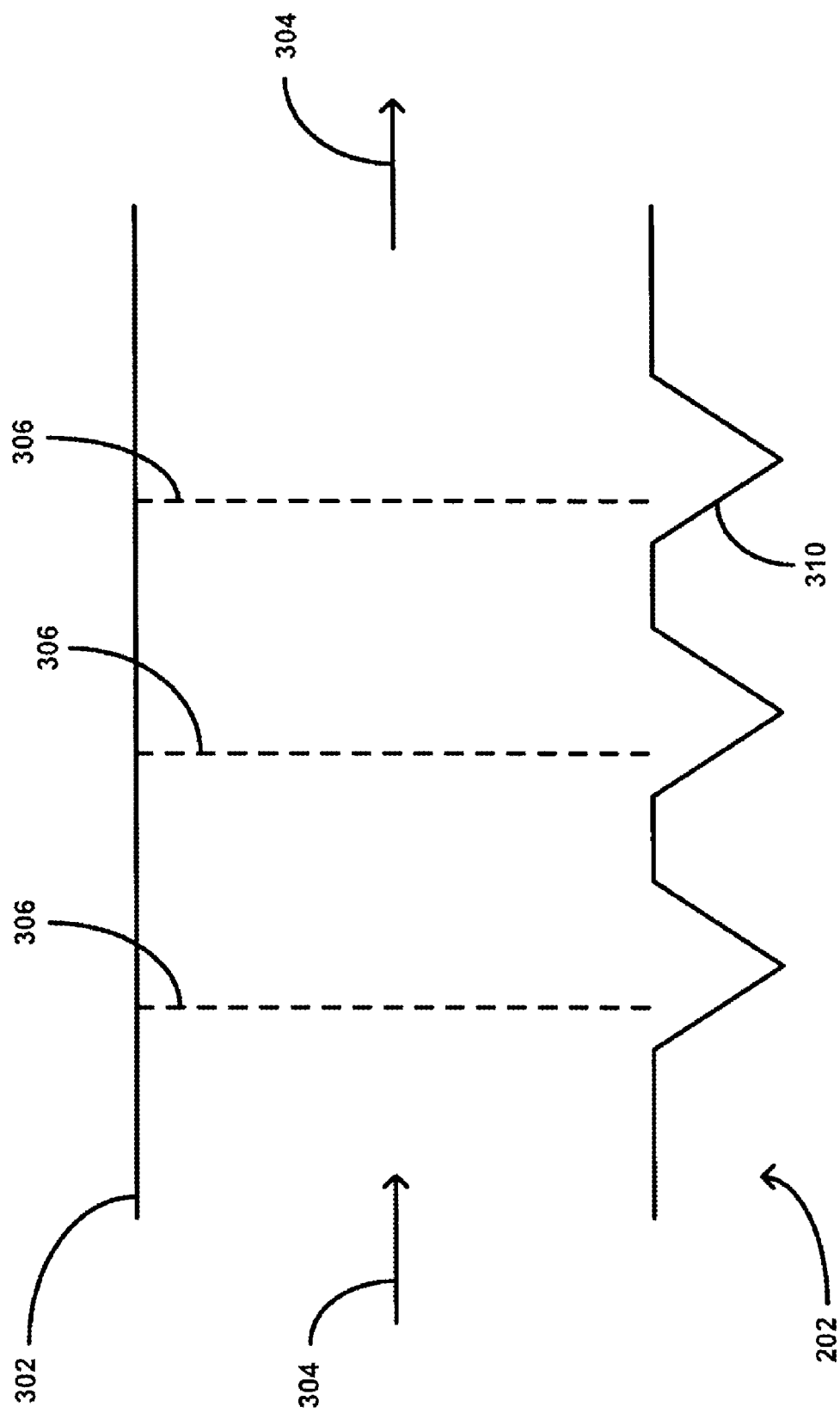
FIG. 3 is a cut-away view of a gas duct and the polisher of FIG. 2.

FIG. 3 is a cut-away view of a gas duct and the polisher of FIG. 2. As shown, the gas passes through the gas duct 302 in the direction shown by the arrows 304. It should be appreciated that a portion of the aerosol and particulate matter in the gas duct has already been removed by the aerosol collection device 106 located upstream of the portion of the gas duct 302 illustrated in FIG. 3. However, that portion of the aerosol and particulate matter that has not been removed by the aerosol collection device 106 would still be in the gas passing through that portion of the gas duct 302 illustrated in FIG. 3.

A plurality of screens 306 are positioned substantially normal to a nominal direction of gas flow 304 through the gas duct 302 and extend across a cross-section of the gas duct 302 such that all of the gas passes through the screens 306. It should be appreciated that in some embodiments, only one screen 306 may be necessary, and in other embodiments, two, three, four, five, or more screens 306 may be used. A significant portion of any aerosols not captured by the primary aerosol collector will be collected in the screen through inertial impaction and by electrostatic forces.

It should be appreciated that if the primary aerosol collection device 106 is an electrostatic precipitator, the particulate matter will be electrically charged, including that portion of the particulate matter that is not collected by the electrostatic precipitator and that passes to the polisher 202. In this case, the charged particles will be easier to collect on the screen 306.

In some embodiments, the screen 306 itself may also be optionally electrically charged to enhance the collection of both neutral and charged aerosols. For example, the screen may comprise a set of parallel wires, wherein each wire has a charge opposite that of wire adjacent to it. Alternatively, the wires may have one charge and the casing holding the wires may have an opposite charge. Alternatively, charged discharge electrodes or rods may be placed in front of the screen to create a potential between the electrodes and the screen. Alternatively, multiple screens may be used in series where each screen has a charge opposite that of an adjacent screen.

These various options for charging the screen may be used in any of the embodiments described herein. Nonetheless, it should be appreciated that charging the screen is optional and not required.

Each screen 306 comprises a single screen having a plurality of holes that allow the gas to pass through the screen 306. The size, shape, and position of the holes in the screen 306 can be varied to optimize the performance of the screen 306 and the gas pressure drop across the screen 306. For example, the holes may be approximately 70 to approximately 7000 mesh wire or woven cloth screens. Alternatively, the screens may be a felted cloth or metal material with a high gas permeability, for example, approximately 100 cfm/ft$^2$ of screen or greater. It should be appreciated that the shape of the holes and the hole pattern may also be varied as desired. For example, the holes could be simple squares or other shapes such a diamond, rectangles, etc. The hole pattern or pitch in the screen may also vary. The materials of construction used for the screen 306 may also be varied and selected based upon the gas composition, such as the corrosivity of the gas, and to optimize the structural integrity of the screen 306. For example, the screen 306 may be constructed from metal wire mesh; woven cloth made from glass, ceramic, carbon, or polymer yarn; or holes punched in a metal or polymer sheet. Given the various options for constructing the screen 306, it should be appreciated that the term "screen" is used throughout generically and should not be construed as limited to, for example, a metal wire screen.

In general operation, the gas stream comprising aerosols, including, for example, particulate matter (or a plurality of particles, particulate, or fly ash) passes through the primary aerosol collection device 106 where a portion of the aerosols and particulate matter is removed from the gas stream. The gas stream then passes from the aerosol collection device 106 to that portion of the downstream gas duct 302 comprising at least one screen 306 where an additional portion of the aerosols, including an additional portion of the particulate matter, are removed from the gas stream. For simplicity, the following operation will be described in terms of a single screen 306, noting that multiple screens 306 may be used.

In those instances where the aerosols, including the particulate matter, in the gas stream are electrically charged by the upstream aerosol collection device 106, further charging of the aerosols and particulate matter may not be necessary prior to the gas stream passing through the screen 306. In those instances where the upstream aerosol collection device 106 does not result in electrically charging of the particulate matter, the aerosols and particulate matter may optionally be separately electrically charged at a point upstream of the screen 306. For example, the aerosols and particulate matter that are not removed by the aerosol collection device 106 may be electrically charged downstream of the aerosol collection device 106 but upstream of the screen 306. The aerosols and particulate matter may even be charged upstream of the aerosol collection device 106 even though the aerosol collection device 106 may not utilize such charging. The exact location where the aerosols and the particles are electrically charged can be determined based on operating conditions and physical constraints of the equipment. Methods for charging the aerosols and particulate matter may be done as described above.

As the aerosol particles and any particulate matter passes through the screen 306 at least a portion of the aerosols and particulate matter are collected on the screen 306 by inertial impaction. Accordingly, the screen 306 acts to polish the gas stream by removing an additional portion of the aerosol particles and particle matter relative to the upstream or primary aerosol collection device 106. As noted, the upstream or primary aerosol collection device 106 initially removes a portion of the aerosol particles and particle matter in the gas stream. The screen 306 or plurality of screens 306 if more than one is used then collect a portion of the aerosol particles and particle matter that are not collected by the upstream aerosol collection device 106. In some embodiments, the screen 306 may collect approximately 10% to approximately 90% of the total aerosol particles and particle matter that are not removed by the upstream aerosol collection device 106. In other embodiments, the screen 306 may collect approximately 10% to approximately 50% of the total aerosol particles and particle matter that are not removed by the upstream aerosol collection device 106. In still other embodiments, the screen 306 may collect approximately 10% to approximately 20% of the total aerosol particles and particle matter that are not removed by the upstream aerosol collection device 106. It should be appreciated that in embodiments that utilize more than one screen that these removal percentages refer to the total aerosol particle and particle matter removals across all such screens collectively.

The gas duct 302 may also be configured to have discharge ports 310 that are connected to hoppers (not shown) on its bottom side to collect the aerosol particles and particulate matter collected by the screens 306. In this embodiment, the screens may be attached to mechanical devices (not shown) that shake the screens 306 to dislodge the aerosol particles and particulate matter attached to the screens 306, which is then collected in the hoppers. Alternatively, spray nozzles may be placed in the gas duct 302 adjacent to each screen 306 to spray wash water against the screen to remove collected aerosol particles and particulate matter, which may also be collected in the hoppers. The aerosol particles and particulate matter collected by the hoppers can then be disposed of. Of course, such mechanical cleaning would need to be performed while the system was offline to avoid re-entrainment of the particulate matter. Accordingly, the system could be designed with a gas bypass that would allow individual or groups of screens 306 to be separated from the gas flow for cleaning.

Figure 4:
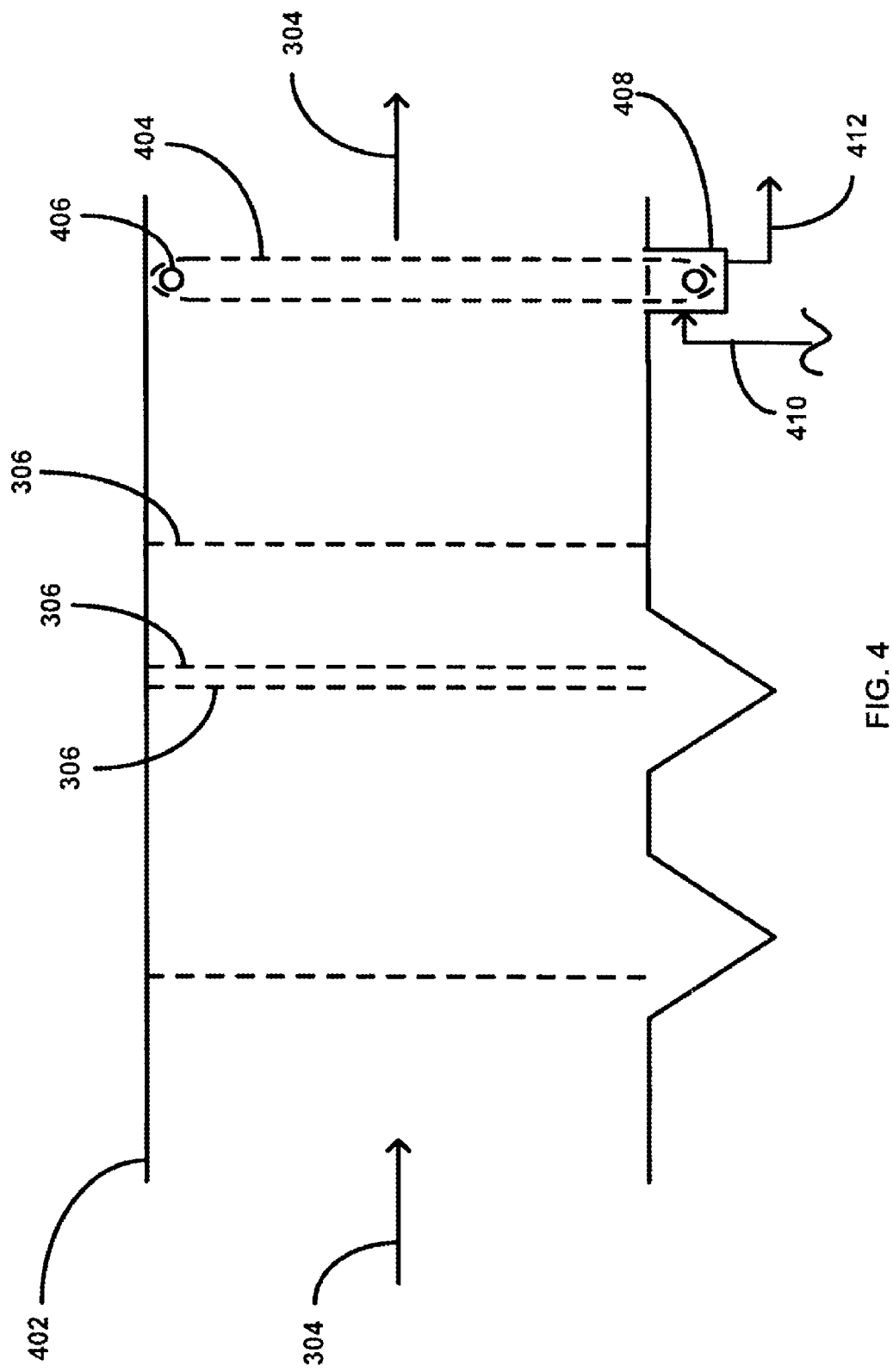
FIG. 4 is a cut-away view of a gas duct and various other embodiments of the polisher of FIG. 2.

FIG. 4 is a cut-away view of a gas duct and various other embodiments of the polisher of FIG. 2. As shown, two or more screens 306 may be positioned next to or adjacent to each other in a gas duct 402. For example, two or more screens 306 may be positioned next to each other such that they are in physical contact. Alternatively, two or more screens may be positioned next to each other such that there is a relatively small space between each screen 306, such as one or more inches, up to one or more feet. In those embodiments where more than one screen 306 is positioned between one or more discharge electrodes 308, such are considered to be next to or adjacent to each other.

Alternatively, or in addition to the single screens 306, a screen 404 may be wrapped around two rollers 406 located at the top and bottom of the gas duct 402. Although one roller 406 is shown as being inside of the gas duct 402, that roller 406 may also be located outside of the gas duct 402. A tank 408 may be connected to the bottom of the gas duct 402 such that the screen 404 may be rotated by the rollers 406 from the gas duct 402 through the tank 408 and back into the gas duct 402. The tank 408 may be filled with water or a wash solution to clean the screen 404 as it rotates through the tank 408. Alternatively, the tank 408 may comprise spray nozzles (not shown) to enhance the cleaning of the screen 402. The tank 408 may be fed with water or a wash solution by a feed line 410 and dirty water or spent wash solution may be discharged from the tank 408 through discharge line 412.

In operation, the screen 404 may be rotated through the tank 408 as desired. For example, such rotation may be done on a regularly scheduled basis, either manually or automatically. Alternatively, rotation may be done continuously or only on an as-needed basis depending upon, for example, the gas pressure drop across the screen 402 or performance in terms of percentage removal of the aerosol particles and particulate matter from the gas stream.

It should be appreciated that in any of the foregoing embodiments, as well as in those described further below, the screen may be coated with a sorbent that acts to adsorb a vapor phase contaminant such as a vapor phase metal, for example, mercury (Hg). In general, the sorbent coating may comprise any composition that adsorbs a given vapor phase contaminant in the gas stream and that can be coated on the screen. Accordingly, the screen composition may be selected such that the sorbent coating will properly coat or attach to the screen. The choice of sorbent composition will be dependent upon the contaminant to be removed from the gas stream, including its physical properties and characteristics, and the gas stream properties, such as temperature and velocity. For example, if vaporous mercury is the contaminant to be removed from the gas stream, the composition of the sorbent may be carbon or activated carbon. Other sorbent compositions useful in mercury removal are those that also react with the mercury, such as gold, which readily forms an amalgam with mercury, or silver or zinc, which also form amalgams. In another embodiment, the sorbent may be a noble metal. It should be appreciated that mixtures of sorbents having different compositions may also be used. In addition, the sorbent coating may also comprise a composition that upon adsorption chemically reacts with the vapor phase contaminant as well. Further, it should be appreciated that in some embodiments, the screen itself may be constructed from a sorbent material. As noted, using a sorbent coating on the screen may also be combined with electrically charging the screen as described above.

With reference to FIGS. 3 and 4, the screen may be a single screen that is essentially fixed in place within a gas duct. In this case, once the sorbent coating is spent, the screen can be removed from the duct and replaced or the coating can be regenerated and the screen returned to service. Alternatively, if a gas bypass configuration is used, it may be possible to clean the screen and regenerate the sorbent coating without removing the screen from the gas duct. Alternatively still, with reference to FIG. 4, the screen with the sorbent coating may be used in conjunction with rollers 406 and an external tank 408. In this configuration, the sorbent coating may be regenerated by performing whatever cleaning and regenerating steps are necessary in the external tank attached to the gas duct. Once the screen has been cleaned and the sorbent coating regenerated, the screen can be rotated, thereby placing that portion or section of the screen with regenerated sorbent coating back into the gas duct and passing a portion or section of the screen with spent sorbent coating into the external tank for cleaning and regeneration. With reference to the external tank 408, the feed line 410 can be used to feed the required chemicals to the tank 408 for cleaning and regeneration, and the discharge line 412 can be used to discharge the vapor phase contaminant from the system for disposal or further treatment.

It should also be appreciated that in any of the foregoing embodiments, as well as in those described further below, a sorbent may be injected into the gas stream upstream of the particulate collection device or a primary particulate collection device as illustrated in FIG. 2. A container 204 holding a sorbent may be injected into the combustion device outlet duct 104 so that it is entrained into the gas stream. The sorbent is selected to adsorb a given vapor phase contaminant, such as mercury (Hg). At least a portion of the sorbent, with or without adsorbed vapor phase contaminant, is then collected in the primary particulate collection device 106. In those instances in which a portion of sorbent, with or without adsorbed vapor phase contaminant, is not collected by the particulate collection device 106, a screen according to any of the foregoing embodiments, or those described below, may be used to supplement removal of the injected sorbent, with or without adsorbed vapor phase contaminant, which is considered to be particulate matter in the gas stream.

Figure 5:
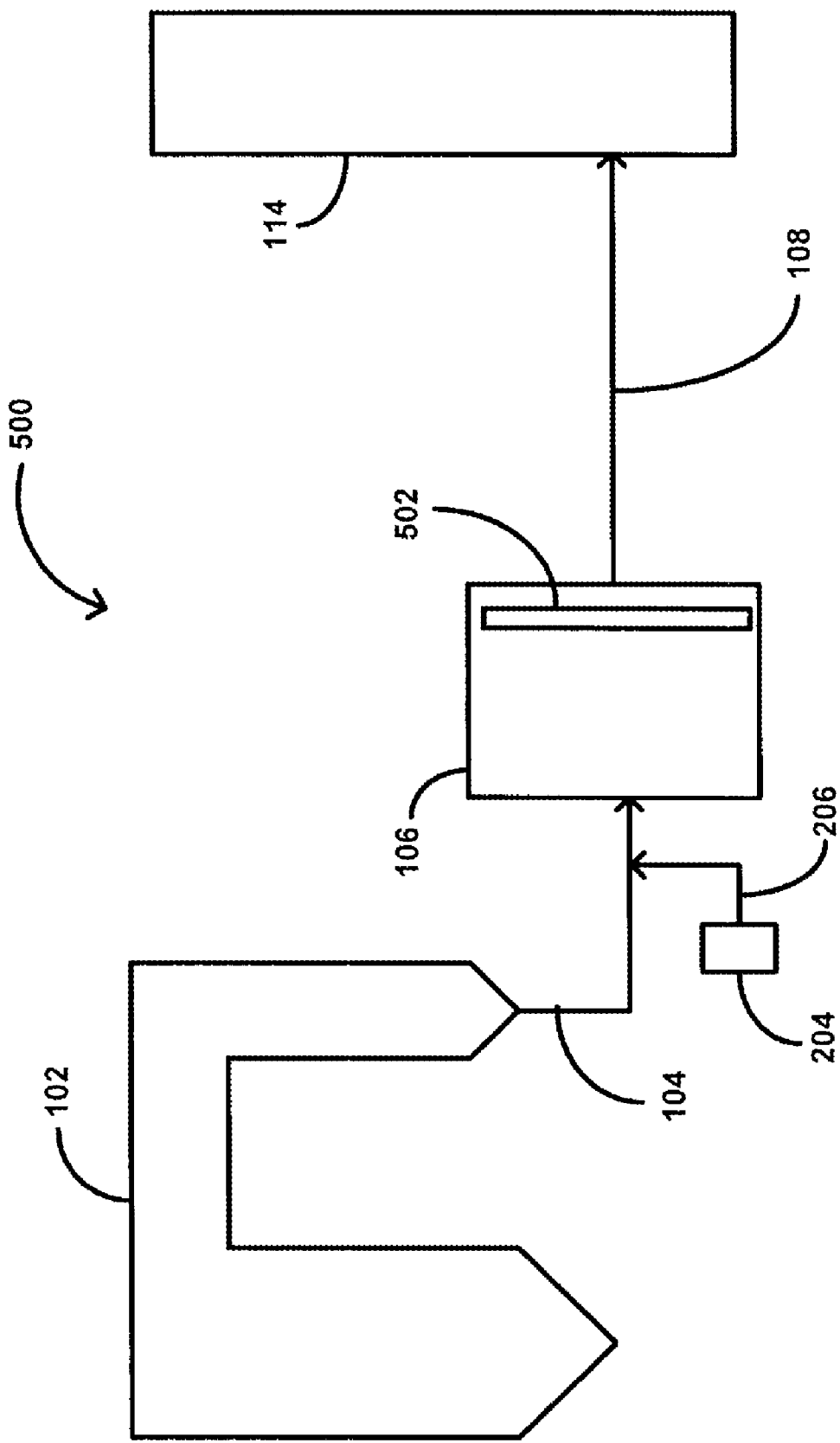
FIG. 5 illustrates another exemplary process according to one embodiment of the present invention.

FIG. 5 illustrates another exemplary process according to one embodiment of the present invention. The process 500 is substantially the same as that illustrated in FIG. 2; however in this embodiment the polisher 502 is housed within the housing of the particulate collection device 106. It should be appreciated that in this FIG. 5, the polisher 502 is simply represented graphically by a box. It should also be appreciated that even though the polisher 502 is located within the housing of the aerosol collection device 106, that portion of the aerosol collection device 106 that collects aerosol particles and particulate matter may still be referred to as a "primary" aerosol collection device relative to the polisher 502 within the same housing.

Figure 6:
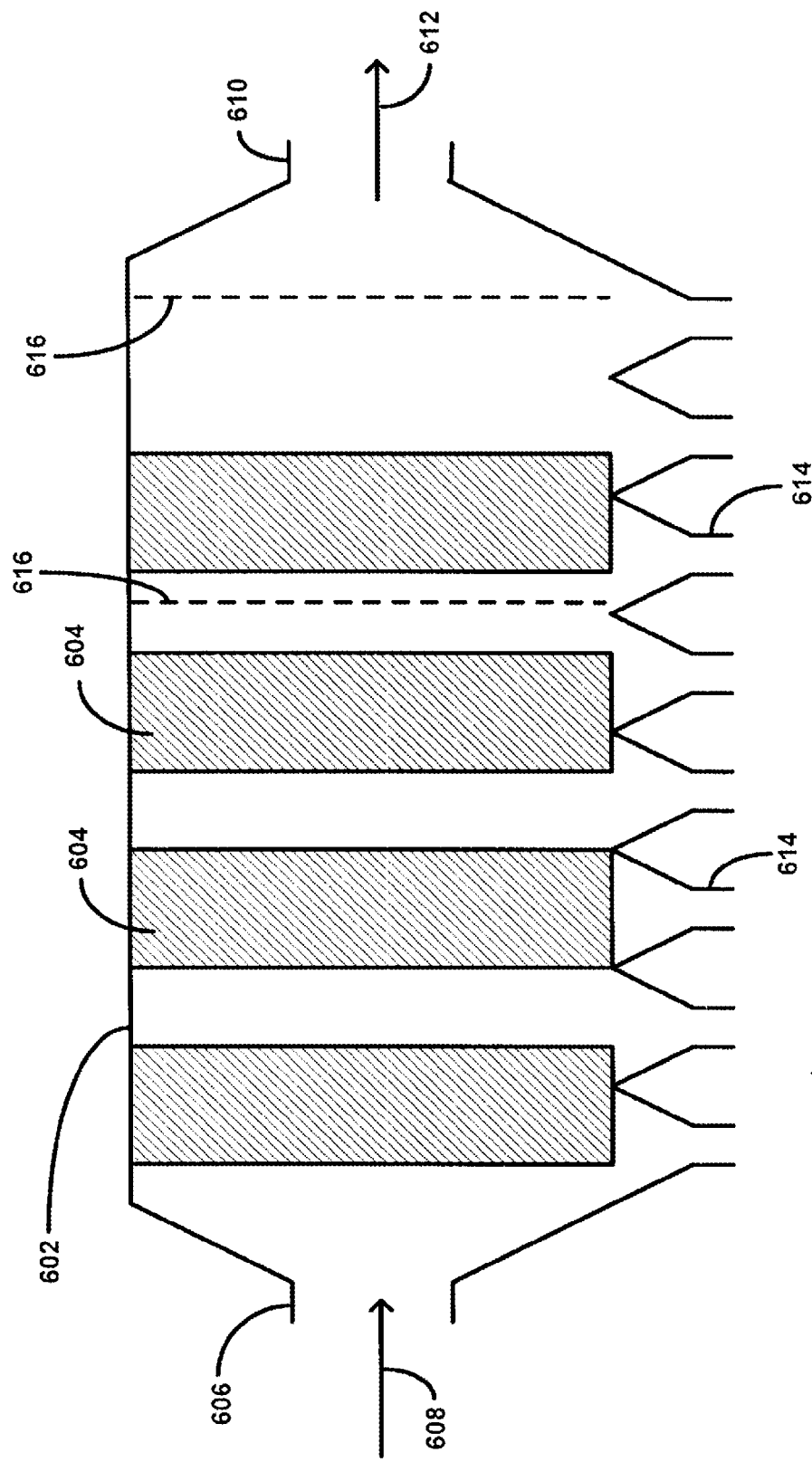
FIG. 6 is a cut-away view of an electrostatic precipitator illustrating exemplary embodiment of the present invention shown in FIG. 5.

FIG. 6 is a cut-away view of an electrostatic precipitator illustrating exemplary embodiment of the present invention shown in FIG. 5. The electrostatic precipitator 600 is the aerosol collection device 106 shown in FIG. 5 and may act as a primary aerosol collection device. The electrostatic precipitator comprises a housing 602 that has multiple aerosol collection sections or regions within the housing 602 where aerosol particles and particulate matter are collected. In this embodiment, each aerosol collection section is an electrically charged collection plate 604 that serves to collect aerosol particles and particulate matter. (The corresponding discharge electrodes that charge the aerosols and particulate matter so that they are attracted to and collected on the electrically charged collection plates 604 are not shown.) The housing 602 further comprises an inlet port 606 through which a gas stream enters the electrostatic precipitator 600 as indicated by the directional arrow 608. The housing 602 also comprises an outlet port 610 through which the gas stream exits the electrostatic precipitator 600 as indicated by the directional arrow 612. The bottom of the housing 602 is connected to a plurality of discharge ports 614 that are operated to discharge collected aerosol particles and particulate matter from the collection plates 604 into hoppers (not shown). The collected aerosol particles and particulate matter in the hoppers is then disposed.

At least one screen 616 is positioned within the housing 602 of the electrostatic precipitator 600. In one embodiment, the screen 616 is located downstream of all of the aerosol collection sections or electrically charged plates 604. It should be appreciated, however, that the single screen 616 may be positioned between any of the electrically charged collection plates 604 within the housing 602 of the electrostatic precipitator 600. It should also be appreciated that a second or any number of additional screens may be placed within the housing 602. Such additional screens may be positioned adjacent to each other, either downstream of all of the electrically charged plates 604 or adjacent to each other in between any two of the electrically charged plates 604; separately positioned between any two of the electrically charged plates 604; or any combination thereof such as individual screens 616 between any two of the electrically charged plates 604 or downstream of all of the electrically charged plates 604 and multiple screens adjacent to one another between any two of the electrically charged plates 604 or downstream of all of the electrically charged plates 604. It should be appreciated that additional discharge electrodes may be used upstream of any particular screen 616, in particular, the screen 616 located downstream of all of the electrically charged plates 604.

The screens 616 are the same as those described above in connection with FIGS. 3 and 4 in design, structure, and operation, including the percentage removals described above relative to the total amount of aerosol particles and particulate matter that passes from or exits from the upstream or primary aerosol collection device. In the embodiments where more than one screen 616 is used, the removal percentages described above refer to the total aerosol particles and particulate matter removal across all screens 616. Similar to FIG. 3, the screens 616 may be mechanically vibrated or washed using spray nozzles positioned within the gas duct adjacent to each screen 616 to displace collected aerosol particles and particulate matter from the screen 616. The aerosol particles and particulate matter may then be collected in the hoppers via the discharge ports 614.

Additionally, as noted above, the screens 616 may be electrically charged. Further, the screens 616 may be coated with a sorbent or constructed from a sorbent and operated as described above, including selection, replacement, and regeneration of the sorbent coating. The sorbent coated screens may also be electrically charged. Further, sorbent injection, as illustrated in FIG. 5, may also be used in conjunction with the screens 616 located within the housing 602 of the electrostatic precipitator 600.

FIG. 7 is a cut-away view of an electrostatic precipitator illustrating another exemplary embodiment of the present invention shown in FIG. 5. The electrostatic precipitator 700 is essentially the same as that as shown in FIG. 6; however, the screen 702 is similar to that illustrated in FIG. 4. In this case, the screen 702 is capable of being rotated using a pair of rollers 704. A tank 706 may be connected to the bottom of the housing 708 of the electrostatic precipitator 700 such that the screen 702 may be from inside the housing 708 through the tank 706 and back into the housing 708. The tank 706 may be filled with water or a wash solution to clean the screen 702 as it rotates through the tank 706. Alternatively, the tank 706 may comprise spray nozzles (not shown) to enhance the cleaning of the screen 702. The tank 706 may be fed with water or a wash solution by a feed line 710 and dirty water or spent wash solution may be discharged from the tank 708 through discharge line 712.

Operation may also be similar to that described in connection with FIG. 4 in that the screen 702 may be rotated through the tank 706 as desired. For example, such rotation may be done on a regularly scheduled basis, either manually or automatically. Alternatively, rotation may be done continuously or only on an as-needed basis depending upon, for example, the gas pressure drop across the screen 702 or performance in terms of percentage removal of the particulate matter from the gas stream. Additionally, in the embodiment where the screen 702 comprises a sorbent coating, the tank 706 may be used in cleaning and regenerating the sorbent coating as described.

FIG. 8 is a cut-away view of a baghouse illustrating another exemplary embodiment of the present invention shown in FIG. 5. In this embodiment, a baghouse 800 is utilized as the aerosol collection device 106 referred to in FIG. 5. The baghouse 800, which may also be a reverse-gas baghouse, comprises a housing 802 and a plurality of filter bags 804 in a chamber 806, which may be referred to as aerosol collection sections or as a primary aerosol collection device. A polisher or screen 808 is positioned above the filter bags 804 within the housing 802 of the baghouse 800. It should be appreciated that more than one screen 808 may be located adjacent to each other.

In operation, a gas stream 809, as shown by the arrows, enters the baghouse 800 in the inlet duct 810 and passes to the ash hopper 812 and into the center of the filter bags 804. The gas passes from the center of the filter bags 804 into the chamber 814 surrounding the filter bags 804. The gas then passes through the screen 808, which allows for collection of aerosol particles and particulate matter that is not removed by the filter bags 804. The gas then passes into the outlet plenum 816.

The screen 808 is the same as that described above in connection with FIGS. 3 and 4 in design, structure, and operation, including the percentage removals described above relative to the amount of total aerosol particles and particulate matter that passes from or exits from the baghouse. In the embodiment where more than one screen 808 is utilized, the removal percentages described above refer to particulate matter removal across all screens 808. Similar to FIG. 3, the screen 808 may be mechanically vibrated to displace collected aerosol particles and particulate matter from the screen 808. The aerosol particles and particulate matter may then be collected in the hoppers in the same manner as the particulate matter collected by the filter bags 804.

Additionally, as noted above, the screen 808 may be electrically charged. Further, the screen 808 may be coated with a sorbent or constructed from a sorbent and operated as described above, including selection, replacement, and regeneration of the sorbent coating. The sorbent coated screens may also be electrically charged. Further, sorbent injection, as illustrated in FIG. 5, may also be used in conjunction with the screen 808 located within the housing 802 of the baghouse 600.

Figure 7:
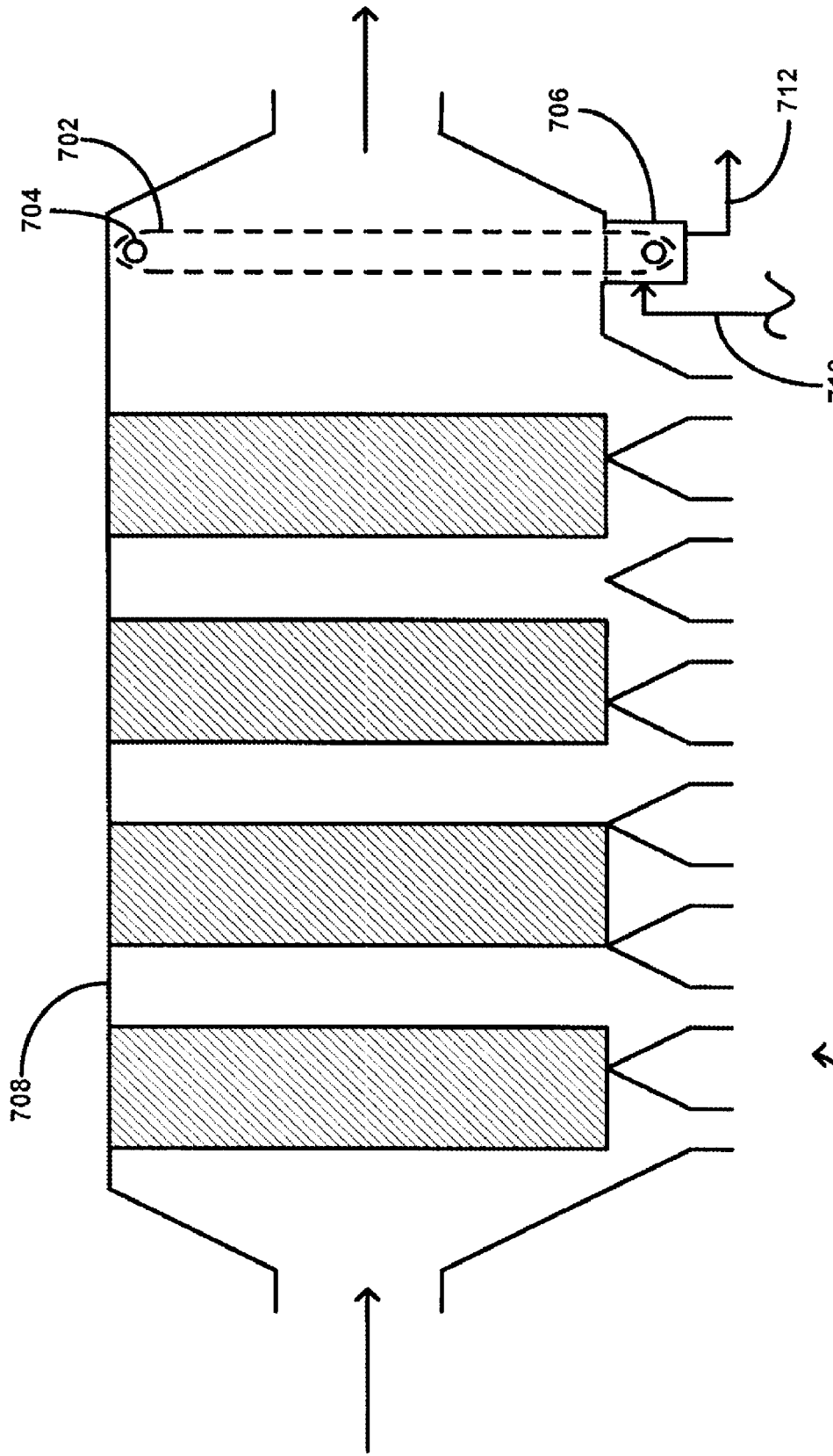
FIG. 7 is a cut-away view of an electrostatic precipitator illustrating another exemplary embodiment of the present invention shown in FIG. 5.
Figure 8:
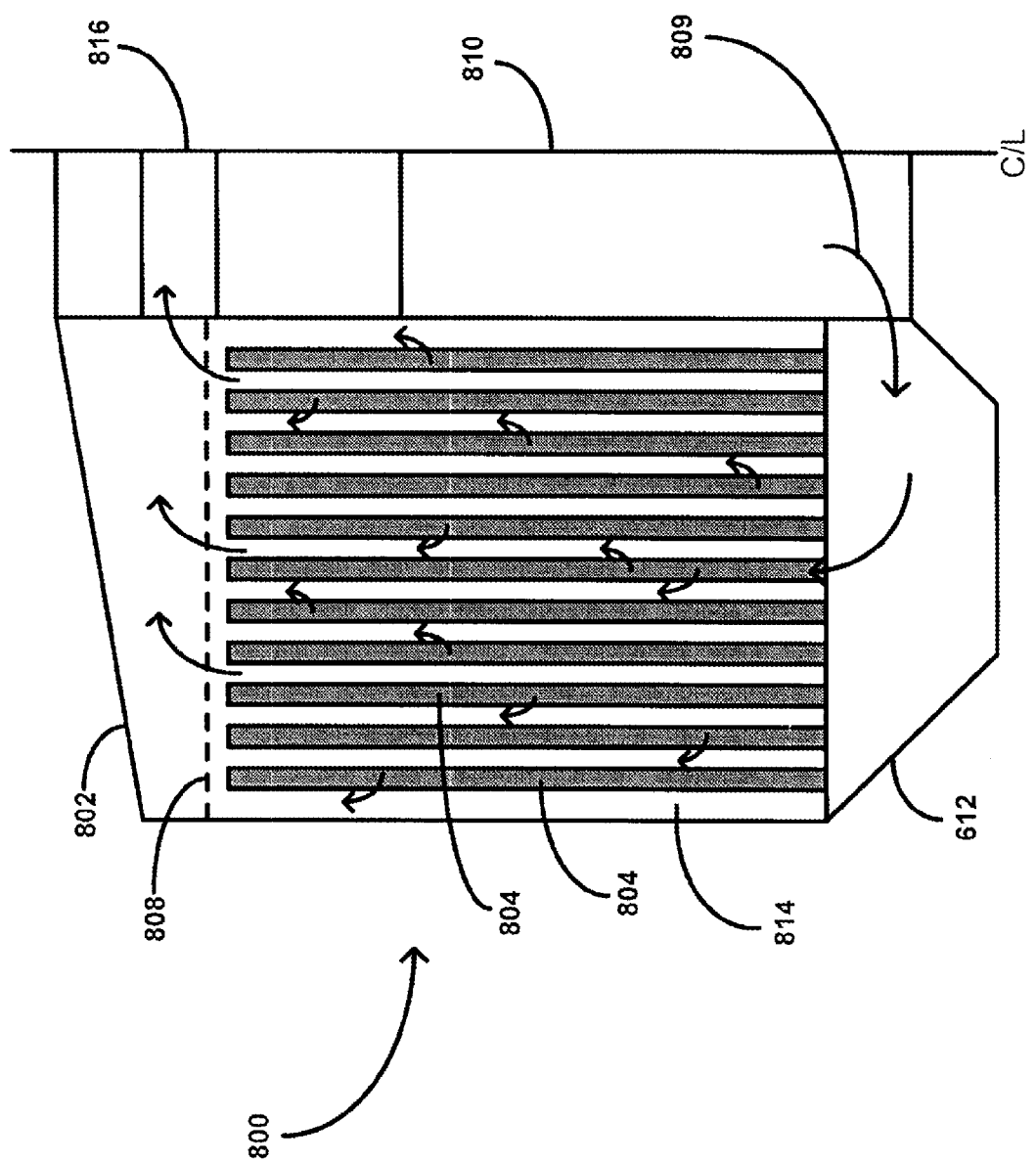
FIG. 8 is a cut-away view of a baghouse illustrating another exemplary embodiment of the present invention shown in FIG. 5.

It should also be appreciated that it may be possible to utilize a screen that can be rotated outside of the housing 802 of the baghouse 800 in a manner similar to that as described in connection with FIG. 7, except that the rotation of the screen would be in a horizontal direction. Further, in order to rotate the screen through a tank an additional set of rollers would be necessary to direct the rotating screen from a horizontal position to a vertical position so that the screen could enter a tank that may hold a liquid for cleaning the screen or regenerating a sorbent coating on the screen.

Figure 9:
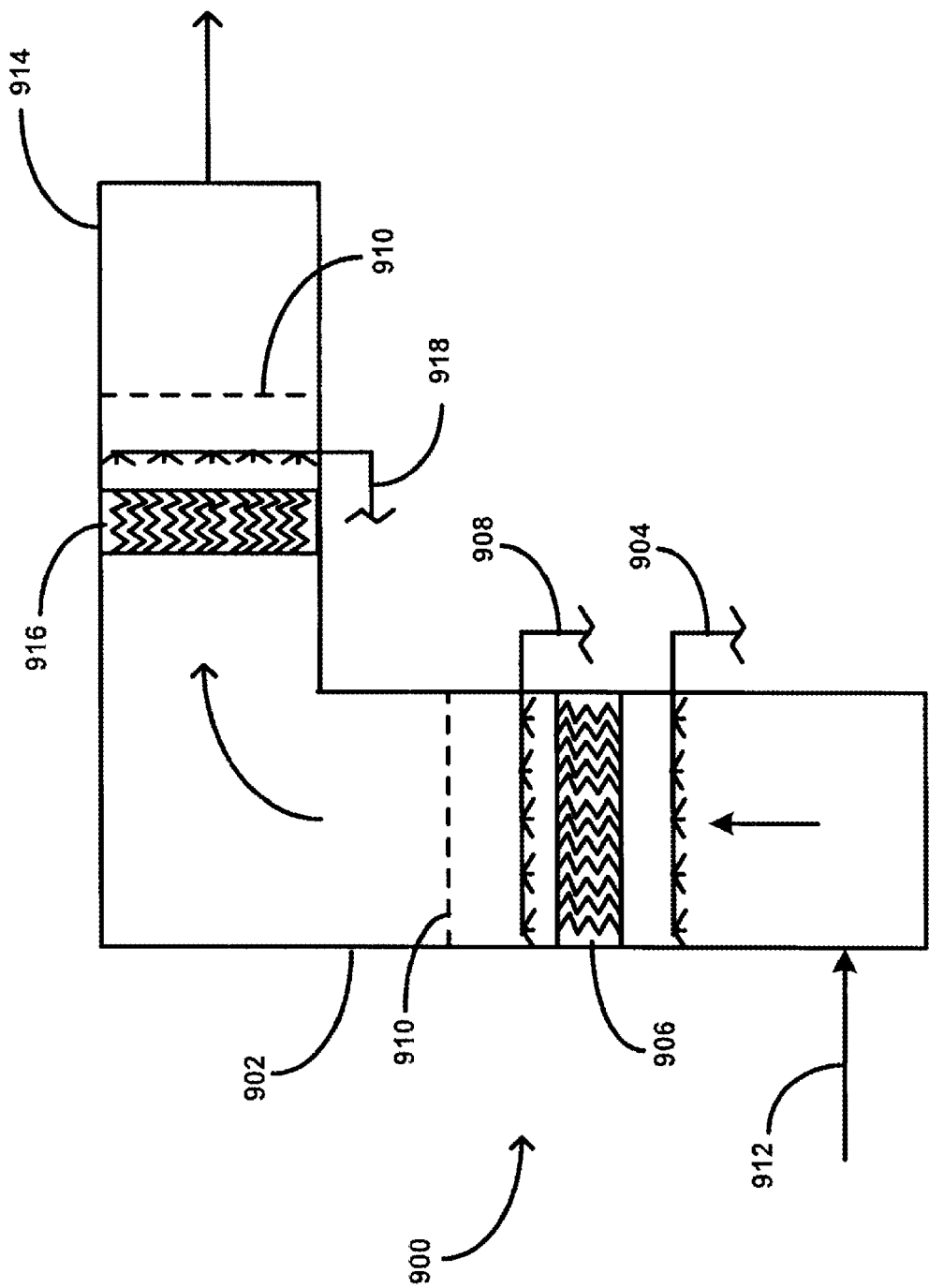
FIG. 9 is a cut-away view of a scrubber illustrating another exemplary embodiment of the present invention.

FIG. 9 is a cut-away view of a scrubber illustrating another exemplary embodiment of the present invention. With reference to FIG. 1, the scrubber 110 is further illustrated in this FIG. 9. In this embodiment, a counter-current wet scrubber 900 comprises a housing 902, a bank of spray nozzles 904, and a vertical mist eliminator section 906 with a corresponding bank of mist eliminator wash nozzles 908. A polisher 910, such as a screen, is positioned within the housing 902 where the gas flow is essentially in a vertical direction and above the vertical mist eliminator section 906. It should be appreciated that more than one screen 910 may be utilized in this location.

Figure 10:
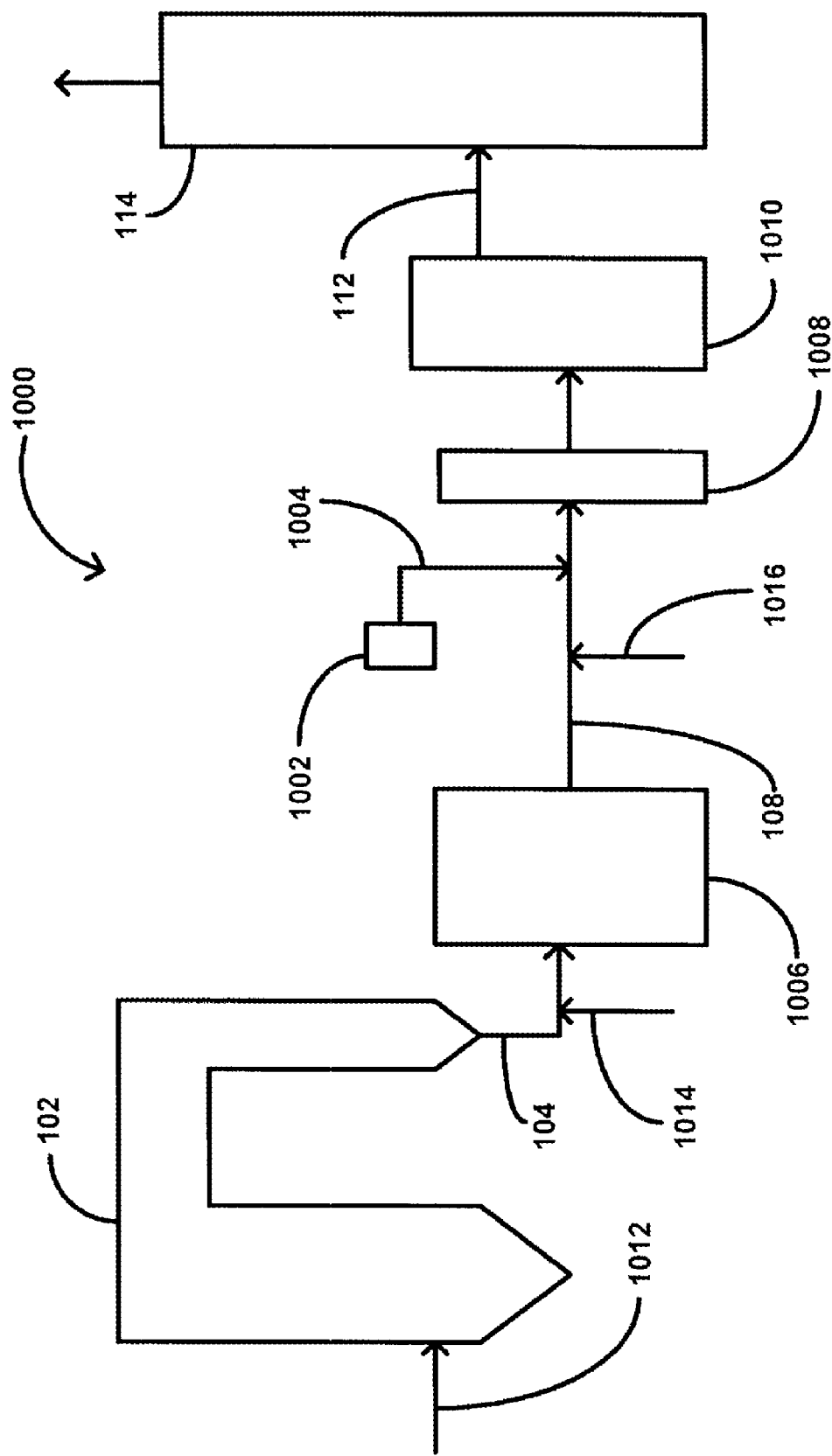
FIG. 10 illustrates a combustion process that incorporates another embodiment of the present invention.

In operation and with reference to FIG. 9, a gas stream containing aerosol particles and particulate matter passes through a aerosol collection device where aerosol particles and particulate matter are removed. The gas stream 912, as shown by the arrows, then enters the bottom of the scrubber 900 and travels up through the scrubber and contacts the scrubbing solution dispensed by the spray nozzles 904. The gas 912 then passes through the vertical mist eliminator 906 and through the screen 910 where aerosol particles and particulate matter are removed. The gas then exits the scrubber 900 through an outlet duct 914. Optionally, the outlet duct 914 may contain a horizontal mist eliminator section 916 and a corresponding bank of wash nozzles 918. A second polisher or screen 910 may be located downstream of the horizontal mist eliminator section 916, which may remove additional aerosol particles and particulate matter. It should be appreciated that more than one screen 910 may also be used in this location. Alternatively, if only one screen 910 is used, such may be located either downstream of the vertical mist eliminator section 906 or the horizontal mist eliminator section 916.

The screens 910 are the same as that described above in connection with FIGS. 3 and 4 in design, structure, and operation, including the percentage removals described above relative to the total amount of aerosol particles and particulate matter that passes from or exits from the aerosol collection device 106 as shown in FIG. 1. In the instance where two or more screens are utilized, the removal percentages described above refer to the total removal obtained across all screens in the scrubber 900, including those in the outlet duct 914. Similar to FIG. 3, the screens 910 may be mechanically vibrated or washed using spray nozzles positioned within the gas duct adjacent to each screen 910 to displace collected aerosol particles and particulate matter from the screen 910. The aerosol particles and particulate matter may then be collected in the scrubbing solution and disposed of with the scrubbing solution.

Additionally, as noted above, the screen 910 may be electrically charged. Further, the screen 910 may be coated with a sorbent or constructed from a sorbent and operated as described above, including selection, replacement, and regeneration of the sorbent coating. The sorbent coated screens may also be electrically charged. Further, sorbent injection, as illustrated in FIG. 5, may also be used in conjunction with the screen 910 located within the housing 902 of the scrubber 900.

It should also be appreciated that it may be possible to utilize a screen that can be rotated outside of the housing 902 of the scrubber 900 in a manner similar to that as described in connection with FIG. 7, except that the rotation of the screen 910 located near the vertical mist eliminator section 906 would be in a horizontal direction. Further, in order to rotate this screen 910 through a tank an additional set of rollers would be necessary to direct the rotating screen from a horizontal position to a vertical position so that the screen could enter a tank that may hold a liquid for cleaning the screen or regenerating a sorbent coating on the screen. Rotation of a screen 910 located in the outlet duct 914 could be accomplished in a manner similar to that described in connection with FIG. 7.

It should also be appreciated that in any of the foregoing embodiments, as well as in those described further below, a sorbent may be injected into the gas stream upstream of the particulate collection device or a primary particulate collection device as illustrated in FIG. 2. A container 204 holding a sorbent may be injected into the combustion device outlet duct 104 so that it is entrained into the gas stream. The sorbent is selected to adsorb a given vapor phase contaminant, such as mercury (Hg). At least a portion of the sorbent, with or without adsorbed vapor phase contaminant, is then collected in the primary particulate collection device 106. In those instances in which a portion of sorbent, with or without adsorbed vapor phase contaminant, is not collected by the particulate collection device 106, a screen according to any of the foregoing embodiments, or those described below, may be used to supplement removal of the injected sorbent, with or without adsorbed vapor phase contaminant, which is considered to be particulate matter in the gas stream.

FIG. 10 illustrates a combustion process that incorporates another embodiment of the present invention. Generally, this embodiment, along with various modifications, is directed to the removal of a vapor phase contaminant from a gas stream. More particularly, this embodiment is directed to the use of a catalyst that catalyzes the reaction of at least a portion of the vapor phrase contaminant from one form into another form that is more easily removed from the gas stream compared to its original form. In other words, the converted vapor phase contaminant may be removed at a higher rate of removal or at a higher percentage removal using a given removal process compared to its original form, or the converted vapor phase contaminant may be in a form that makes removal more effective or more cost effective using a different removal process that otherwise would not provide sufficient removal of the vapor phase contaminant in its original form. In one embodiment, as described below further below, a catalyst is used to convert at least a portion of vapor phase elemental mercury into an oxidized form, which is more easily removed from a gas stream, for example, by a polisher, such as those described above compared to removal of its original, elemental form.

FIG. 10 illustrates a combustion process 1000 comprising a combustion device 102, such as a fossil-fuel-fired boiler or more specifically a coal-fired boiler, that produces a gas stream in the form of flue gas. The flue gas produced within the combustion device 102 comprises, among other things, aerosols and vapor phase contaminants, such as vapor phase elemental mercury. The flue gas exits the combustion device 102 through a combustion device outlet duct 104 and passes to a primary aerosol collection device 1006, which can be any aerosol collection device such as a particulate collection device (e.g., a wet or dry electrostatic precipitator or a baghouse comprising filter bags), that removes aerosols from the flue gas. The flue gas passes from the primary aerosol collection device 1006 through an aerosol collection device outlet duct 108 to a polisher 1008, such as any of the polishers described previously in connection with FIGS. 2-4. Upon exiting the polisher 1008, the flue gas passes to an absorber or scrubber 1010, such as a wet scrubber, through a scrubber outlet duct 112, and ultimately to the stack 114 where it is discharged to the atmosphere.

A container 1002 is used to hold a catalyst for injection into the flue gas through an injection line 1004. The specific equipment necessary to inject the catalyst into the flue gas, either in a dry or wet form, is well known. The injection line 1004 is positioned to inject the catalyst downstream of the primary aerosol collection device 1006 and upstream of the polisher 1008.

The catalyst is selected based upon the reaction that converts a given vapor phase contaminant into a form that is more easily removed from the gas stream compared to its original form. For example, in one embodiment, the reaction is the oxidation of vapor phase elemental mercury, since an oxidized form of mercury is more easily removed from a gas stream compared to removal of the elemental form. For this reaction, carbon has been identified as a catalyst.

In operation, the catalyst is injected into the flue gas as a dry powder; however, the catalyst can be injected into the flue gas as a slurry. The injection rate of the catalyst, whether done on a continuous, periodic, or batch-wise basis, will depend upon several factors, including the specific reaction to be catalyzed, the reaction kinetics, the concentration of the vapor phase contaminant in the flue gas, the amount of catalyst collected by the polisher 1008, and the desired conversion of the vapor phase contaminant to the new form. The optimal injection rate for any given system can be easily determined by measuring the removal rate of a given vapor phase contaminant, particularly across the scrubber 1010, at various the injection rates and methods, including injection on a continuous, periodic, or batch-wise basis. In some embodiments, the injection of the polisher 1008. For example, injection of the catalyst may be done immediately after or soon after the polisher 1008 has been cleaned to ensure maximum removal of the catalyst from the flue gas.

The catalyst is carried with the flue gas to the polisher 1008, where at least a portion of it is captured. As the flue gas continues to pass through the polisher 1008, the vapor phase contaminant will contact the catalyst collected by the polisher 1008 resulting in the conversion of the vapor phase contaminant to the desired form that is more easily removed from the flue gas.

In some embodiments, the desired form of the vapor phase contaminant may be one that is more easily removed from the flue gas using absorption. In such cases, the absorber or scrubber 1010 is used to absorb the vapor phase contaminant. It should be appreciated that the scrubber 1010 may be replaced with any unit operation or removal process capable of providing better removal rates or percentage removals of the vapor phase contaminant after it has been converted into the desired form compared to removal of the original form of the vapor phase contaminant using the same or a different removal process.

The oxidation of vapor phase elemental mercury using carbon as a catalyst can be used as an example to further illustrate one embodiment of the present invention corresponding to FIG. 10. In this case, carbon is used as a catalyst for the oxidation of vapor phase elemental mercury into an oxidized form. The carbon can be any form of carbon, including, for example, non-activated or activated carbon, and may even include other materials that have some carbon content. The carbon, in powdered form, can be injected into the flue gas, and at least a portion of the carbon is collected in the polisher 1008. As the flue gas and the elemental mercury pass through the polisher 1008, the elemental mercury will contact the collected carbon, which is available to catalyze the reaction of the elemental mercury into an oxidized form, resulting in the oxidation of the elemental mercury into an oxidized form. This oxidized form of mercury then passes with the flue gas to the scrubber 1010 where it is absorbed and removed from the flue gas. As described above, the scrubber 1010 may be a wet scrubber or wet flue gas desulfurization system or any other device capable of absorbing the oxidized mercury. In some embodiments, the carbon catalyst may be at a rate of approximately 0.5 pounds of carbon per million cubic feet of gas for a period of approximately 1-10 minutes. It should be appreciated that the injection rate and the amount of carbon injected for use as a catalyst is much less than the rates and amounts of activated carbon used as a sorbent to adsorb mercury. Therefore, the cost of mercury removal can be significantly less compared to the use of activated carbon as a sorbent.

In those embodiments specifically directed to the use of carbon as a catalyst in the removal of mercury from a coal-fired boiler, the injection of carbon may be reduced or eliminated by causing the boiler to produce a certain amount of unburnt carbon. This unburnt carbon will pass with the flue gas from the boiler to the primary aerosol collection device 1006, where it will be collected and act as a catalyst in converting elemental mercury to an oxidized form of mercury. In this case, the container 1002 and injection line 1004 can be eliminated or used as a supplemental or back-up catalyst feed system. In addition, any unburnt carbon that is not collected by the primary aerosol collector 1006 may be collected by the polisher where it can act as a catalyst in converting elemental mercury to an oxidized form of mercury.

In another embodiment, as also depicted in FIG. 10, an additional chemical may optionally be added to the flue gas to enhance the removal of a given vapor phase contaminant. For example, this additional chemical may be a reactant that increases the rate of conversion or reaction of a given vapor phase contaminant to a desired form that is more easily removed from the flue gas. As shown, the additional chemical may be injected into the flue gas in the combustion device 102 at injection point 1012, in the combustion device outlet duct 104 at injection point 1014, or downstream of the primary aerosol collection device 1006 but upstream of the polisher 1008 at injection point 1016. The additional chemical may also be injected at all of these locations or at any combination of these locations. The injection rate of the additional chemical is dependent upon the particular vapor phase contaminant being removed and the specific reaction being catalyzed to convert the vapor phase contaminant to a more easily removed form. It should be appreciated that the amount of catalyst injected can be reduced based upon the injection of an additional chemical and that the optimal ratio of injection rates can be identified by measuring the removal of the given vapor phase contaminant at various combinations of injection rates. Further, by measuring the removal of the given vapor phase contaminant, the optimal injection location or locations for the additional chemical can be determined.

In one embodiment, the additional chemical may be a halogen that can be used to enhance the removal of vapor phase mercury. In this embodiment, carbon may be used to catalyze the reaction of vapor phase elemental mercury to an oxidized form of mercury, and the halogen may be used to further increase the rate of oxidation. For example, chloride or bromide may be used as the halogen to increase the rate of oxidation of elemental mercury to mercuric chloride or mercuric bromide. The chloride or bromide may be injected into the combustion device 102 or the flue gas as its corresponding acid or salt, such as hydrogen chloride or calcium chloride or hydrogen bromide or calcium bromide. It should be appreciated that in some embodiments, the fuel used in the combustion device 102 may naturally produce a certain quantity of halogen in the flue gas. In this case, the amount of the halogen required to increase the rate of conversion of mercury to an oxidized form may vary depending upon the quantity of halogen provided by the fuel itself.

Figure 11:
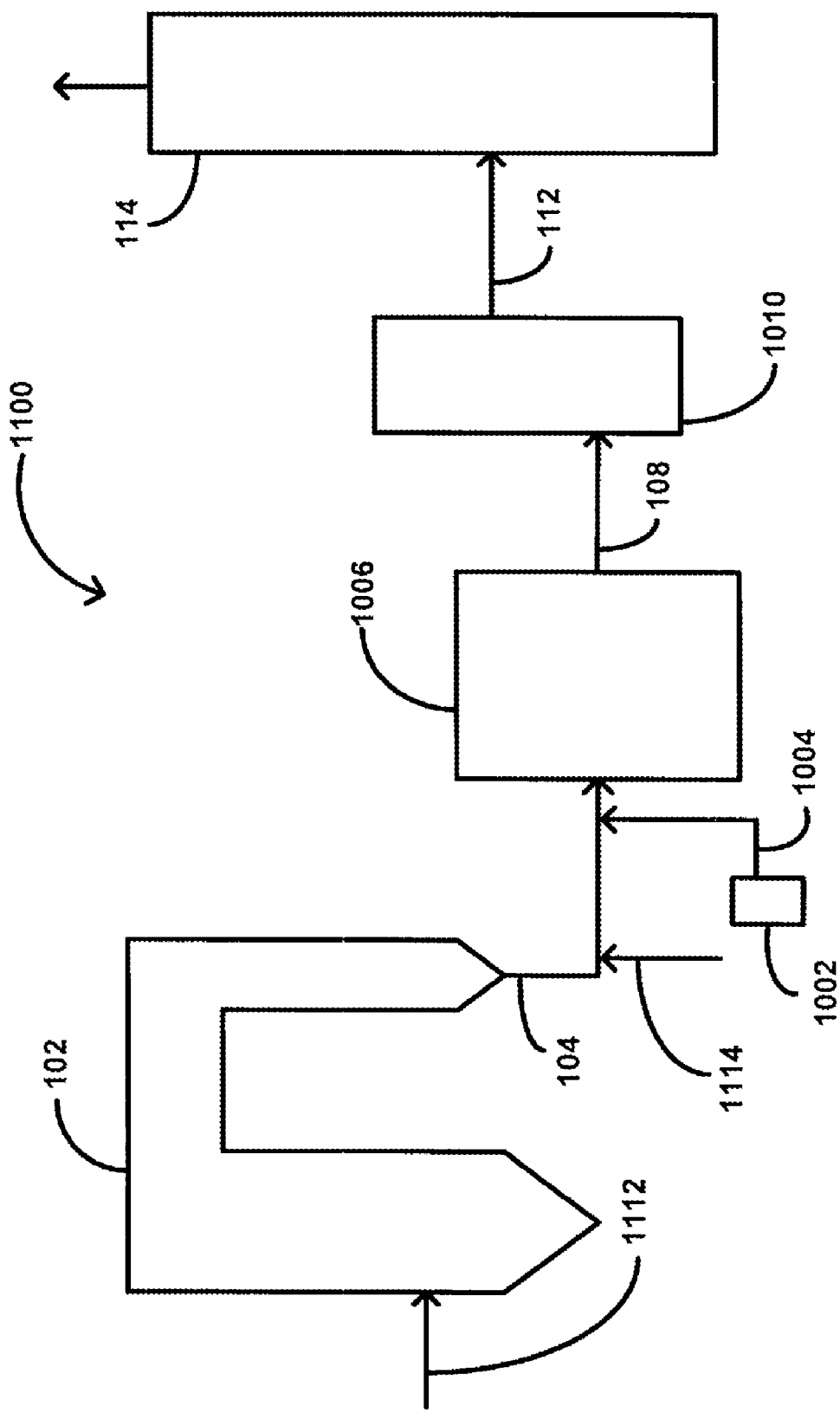
FIG. 11 illustrates a combustion process that incorporates another embodiment of the present invention.

FIG. 11 illustrates a combustion process 1100 that is similar to that described in connection with FIG. 10 with two exceptions. First, the catalyst injection system is configured to inject the catalyst upstream of the primary aerosol collection device 1006, and second, a polisher is not used. It should be appreciated, however, that while the following description refers to injection of the catalyst upstream of the primary aerosol collection device 1006, the catalyst can be injected upstream of any aerosol collection device. Accordingly, the description of this embodiment should not be viewed as limited to injection of a catalyst upstream of a primary aerosol collection device.

In operation of this embodiment, the catalyst is injected upstream of the primary aerosol collection device 1006 so that at least a portion of the catalyst is collected by the primary aerosol collection device 1006, which can be any aerosol collection device such as a particulate collection device (e.g., a wet or dry electrostatic precipitator or a baghouse). As the flue gas continues to pass through the primary aerosol collection device 1006, the vapor phase contaminant will contact the catalyst collected by the primary aerosol collection device 1006 resulting in the conversion of the vapor phase contaminant to the desired form that is more easily removed from the flue gas.

The selection of the catalyst and the method of injection and injection rates can be the same as those described in connection with FIG. 10, noting that the catalyst needs to be injected upstream of the primary aerosol collection device 1006. However, in some embodiments, the injection of the catalyst may be coordinated with the cleaning of the primary aerosol collection device 1006. For example, injection of the catalyst may be done immediately after or soon after the primary aerosol collection device 1006 has been cleaned to ensure maximum removal of the catalyst from the flue gas.

In some embodiments, the desired form of the vapor phase contaminant may be one that is more easily removed from the flue gas using absorption. In such cases, the absorber or scrubber 1010 is used to absorb the vapor phase contaminant. It should be appreciated that the scrubber 1010 may be replaced with any unit operation or removal process capable of providing better removal rates or percentage removals of the vapor phase contaminant after it has been converted into the desired form compared to removal of the original form of the vapor phase contaminant using the same or a different removal process.

As described above in connection with FIG. 10, the oxidation of vapor phase elemental mercury using carbon as a catalyst can be used as an example to further illustrate one embodiment of the present invention corresponding to FIG. 11. Again, carbon may be used as a catalyst for the oxidation of vapor phase elemental mercury into an oxidized form. The carbon can be any form of carbon, including, for example, non-activated or activated carbon, and may even include other materials that have some carbon content. The carbon, in powdered form, can be injected into the flue gas, and at least a portion of the carbon is collected in the primary aerosol collection device 1006. For example, the primary aerosol collection device 1006 may be a baghouse filter, in which case, the carbon powder will be collected on the filter cloth of the filter bags in the baghouse.

As the flue gas and the elemental mercury pass through the primary aerosol collection device 1006, the elemental mercury will contact the collected carbon, which is available to catalyze the reaction of the elemental mercury into an oxidized form, resulting in the oxidation of the elemental mercury into an oxidized form. This oxidized form of mercury then passes with the flue gas to the scrubber 1010 where it is absorbed and removed from the flue gas. As described above, the scrubber 1010 may be a wet scrubber or wet flue gas desulfurization system or any other device capable of absorbing the oxidized mercury.

In some embodiments in which carbon is used to catalyze the oxidation of mercury, the carbon may be injected immediately after or soon after cleaning of the primary aerosol collection device 1006 at an injection rate of approximately 0.5 pounds of carbon per million cubic feet of gas for a period of approximately 1-10 minutes. Again, it should be appreciated that the injection rate and the amount of carbon injected for use as a catalyst is much less than the rates and amounts of activated carbon used as a sorbent to adsorb mercury. Therefore, the cost of mercury removal can be significantly less compared to the use of activated carbon as a sorbent.

As similarly described in connection with FIG. 10, in those embodiments specifically directed to the use of carbon as a catalyst in the removal of mercury from a coal-fired boiler, the injection of carbon may be reduced or eliminated by causing the boiler to produce a certain amount of unburnt carbon. This unburnt carbon will pass with the flue gas from the boiler to the primary aerosol collection device 1006, where it will be collected and act as a catalyst in converting elemental mercury to an oxidized form of mercury. In this case, the container 1002 and injection line 1004 can be eliminated or used as a supplemental or back-up catalyst feed system.

One benefit of the various embodiments described in connection with FIG. 11 by converting mercury to an oxidized form is a reduced concentration of mercury in the fly ash collected compared to those processes in which mercury is captured and removed with the fly ash, such as processes using sorbent injection in which mercury is adsorbed onto a sorbent and collected with the fly ash. By converting the elemental mercury to an oxidized form, less mercury will be collected with the aerosols and, in particular with the fly ash. Accordingly, the collected fly ash will more easily meet any required standards for commercial use, such as use in concrete.

In another embodiment, as depicted in FIG. 11, an additional chemical may optionally be added to the flue gas to enhance the removal of a given vapor phase contaminant. For example, this additional chemical may be a reactant that increases the rate of conversion or reaction of a given vapor phase contaminant to a desired form that is more easily removed from the flue gas. As shown, the additional chemical may be injected into the flue gas in the combustion device 102 at injection point 1112, in the combustion device outlet duct 104 but upstream of the primary aerosol collection device 1006 at injection point 1114, or both. The injection rate of the additional chemical is dependent upon the particular vapor phase contaminant being removed and the specific reaction being catalyzed to convert the vapor phase contaminant to a more easily removed form. It should be appreciated that the amount of catalyst injected can be reduced based upon the injection of an additional chemical and that the optimal ratio of injection rates can be identified by measuring the removal of the given vapor phase contaminant at various combinations of injection rates. Further, by measuring the removal of the given vapor phase contaminant, the optimal injection location or locations for the additional chemical can be determined.

As similarly described above in connection with FIG. 10, in one embodiment, the additional chemical may be a halogen that can be used to enhance the removal of vapor phase mercury. In this embodiment, carbon may be used to catalyze the reaction of vapor phase elemental mercury to an oxidized form of mercury, and the halogen may be used to increase the rate of oxidation. For example, chloride or bromide may be used as the halogen to increase the rate of oxidation of elemental mercury to mercuric chloride or mercuric bromide. The chloride or bromide may be injected into the combustion device 102 or the flue gas as its corresponding acid or salt, such as hydrogen chloride or calcium chloride or hydrogen bromide or calcium bromide. It should be appreciated that in some embodiments, the fuel used in the combustion device 102 may naturally produce a certain quantity of halogen in the flue gas. In this case, the amount of the halogen required to increase the rate of conversion of mercury to an oxidized form may vary depending upon the quantity of halogen provided by the fuel itself.

Although a fossil-fuel-fired boiler has been referenced in connection with FIGS. 10 and 11, the use of a catalyst to convert a vapor phase contaminant into a form that is more easily removed from the gas stream may be applied to any type of gas stream comprising a vapor phase contaminant. In addition, the use of carbon as a catalyst to oxidize mercury into a form that is more easily absorbed should not be viewed as limiting. In other words, other catalysts may be used for converting other vapor phase contaminants to form that are more easily removed from the gas stream. In addition, while the various embodiments above have been described in the context of converting a vapor phase contaminant to a form that is more easily removed from the flue gas, it is also possible to add a catalyst to convert a vapor phase contaminant to the form that upon removal produces a product that is more easily disposed or a more commercially useful product. For example, catalysts may be injected as described in the various embodiments of FIGS. 10 and 11 to oxidize nitrogen or sulfur dioxide to further oxidized forms (nitrogen dioxide and sulfur trioxide, respectively) that upon absorption from the gas phase will generate commercially useful chemicals (nitric acid and sulfuric acid, respectively).

Various embodiments of the invention have been described above. The descriptions are intended to be illustrative of various embodiments of the present invention and are not intended to be limiting. It will be apparent to one of skill in the art that modifications may be made to the invention as described without departing from the scope of the claims set out below. For example, it is to be understood that although the various embodiments have been described as removing both aerosol particles and particulate matter that these embodiments may be used to remove aerosol particles alone in those cases where particulate matter may not be present or present in sufficient quantities, or vice versa. In those cases where there is virtually no particulate matter present, it should be appreciated that the removal percentages described above would refer to the total removal of the aerosol particles and vice versa. Further, although the invention has been described in some embodiments using mercury as an exemplary vapor phase contaminant, any contaminant including other trace metal contaminants may be removed by the present invention and that more than one such contaminant may be removed in some embodiments of the present invention. It should also be appreciated that the present invention is adaptable to existing particulate collecting devices and their respective housings. Furthermore, it is to be understood that although the invention has been described in some embodiments in connection with flue gas streams from coal-fired combustion processes, it is contemplated that the invention may be used in connection with any gas stream containing a vapor phase contaminant.

What is claimed is:

1. A method for removing particular matter from a gas stream, comprising:
    passing a gas stream comprising particulate matter through a primary aerosol collection device and removing a first portion of the particulate matter;
    passing the gas stream through at least one screen positioned in a gas duct downstream of the primary aerosol collection device; and
    collecting a second portion of the particulate matter on the at least one screen thereby polishing said gas stream, wherein the at least one screen is configured to allow a portion of the at least one screen to move out of the gas duct for cleaning while a remaining portion of the at least one screen remains in the gas duct.

2. The method of claim 1, wherein said collecting further comprises removing at least one vapor phase contaminant from the gas stream.

3. The method of claim 1, wherein the at least one screen is electrically charged.

4. The method of claim 1, further comprising:
    passing the gas stream through a second screen after said collecting the second portion of the particulate matter on the at least one screen; and
    collecting a third portion of the particulate matter on the second screen.

5. The method of claim 1, wherein said collecting produces collected particulate matter on the at least one screen, and further comprising cleaning the at least one screen by removing at least a portion of the collected particulate matter.

6. The method of claim 5, wherein said cleaning comprises vibrating the at least one screen to dislodge at least a portion of the collected particulate matter.

7. The method of claim 1, wherein the gas stream further comprises a plurality of aerosols, wherein said passing the gas stream through the primary aerosol collection device further comprises removing a first portion of the plurality of aerosols, and wherein said collecting comprises collecting a second portion of the plurality of aerosols on the at least one screen.

8. The method of claim 7, wherein said collecting produces collected particulate matter and collected aerosols on the at least one screen, and further comprising cleaning the at least one screen by removing at least a portion of the collected particulate matter and the collected aerosols.

9. The method of claim 8, wherein said cleaning comprises vibrating the at least one screen to dislodge at least a portion of the collected particulate matter and the collected aerosols.

10. The method of claim 8, wherein said cleaning comprises washing the portion of the at least one screen.

11. A method for removing aerosols from a gas stream, comprising:
    passing a gas stream comprising aerosols through a primary aerosol collection device and removing a first portion of the aerosols;
    passing the gas stream through at least one screen positioned in a gas duct and downstream of the primary aerosol collection device; and
    collecting a second portion of the aerosols on the at least one screen thereby polishing said gas stream, wherein the at least one screen is configured to allow a portion of the at least one screen to move out of the gas duct for cleaning during said passing of the gas stream through the at least one screen while a remaining portion of the at least one screen remains in the gas duct.

12. The method of claim 11, wherein said collecting further comprises removing at least one vapor phase contaminant from the gas stream.

13. The method of claim 11, wherein the at least one screen is electrically charged.

14. The method of claim 11, further comprising:
    passing the gas stream through a second screen after said collecting the second portion of the particulate matter on the at least one screen; and
    collecting a third portion of the aerosols on the second screen.

15. The method of claim 11, wherein said collecting produces collected aerosols on the at least one screen, and further comprising:
    moving the portion of the at least one screen out of the gas duct; and
    cleaning the portion of the at least one screen by removing at least a portion of the collected aerosols from the portion of the at least one screen.

16. The method of claim 15, wherein said cleaning comprises washing the portion of the at least one screen.

17. The method of claim 15, wherein the portion of the at least one screen comprises a first portion of the at least one screen, and further comprising moving a second portion of the at least one screen into the gas duct.

18. The method of claim 15, wherein said cleaning produces a cleaned portion of the at least one screen, and further comprising moving the cleaned portion of the at least one screen back into the gas duct.

19. The method of claim 18, further comprising moving a second portion of the at least one screen out of the gas duct for cleaning.

20. A method for removing particular matter from a gas stream, comprising:
    passing a gas stream comprising particulate matter and a plurality of aerosols through a primary aerosol collection device and removing a first portion of the particulate matter and a first portion of the plurality of aerosols;
    passing the gas stream through at least one screen positioned downstream of the primary aerosol collection device;
    collecting a second portion of the particulate matter and a second portion of the plurality of aerosols on the at least one screen to produce collected particulate matter and collected aerosols on the at least one screen, wherein the at least one screen is configured to allow a portion of the at least one screen to move out of the gas stream for cleaning while a remaining portion of the at least one screen remains in the gas stream;
    cleaning the portion of the at least one screen by removing at least a portion of the collected particulate matter and the collected aerosols, wherein said cleaning comprises washing the portion of the at least one screen and wherein said washing is performed using spray nozzles.

21. A method for removing aerosols from a gas stream, comprising:
    passing a gas stream comprising aerosols through a primary aerosol collection device and removing a first portion of the aerosols;
    passing the gas stream through at least one screen positioned in a gas duct and downstream of the primary aerosol collection device;
    collecting a second portion of the aerosols on the at least one screen to produce collected aerosols on the at least one screen thereby polishing said gas stream, wherein the at least one screen is configured to allow a portion of the at least one screen to move out of the gas duct for cleaning during said passing of the gas stream through the at least one screen;
    moving the portion of the at least one screen out of the gas duct; and
    cleaning the portion of the at least one screen by removing at least a portion of the collected aerosols from the portion of the at least one screen, wherein said cleaning comprises washing the portion of the at least one screen and wherein said washing is performed using spray nozzles.

22. A method for removing aerosols from a gas stream, comprising:
    passing a gas stream comprising aerosols through a primary aerosol collection device and removing a first portion of the aerosols;
    passing the gas stream through at least one screen positioned in a gas duct and downstream of the primary aerosol collection device;
    collecting a second portion of the aerosols on the at least one screen to produce collected aerosols on the at least one screen thereby polishing said gas stream, wherein the at least one screen is configured to allow a portion of the at least one screen to move out of the gas duct for cleaning during said passing of the gas stream through the at least one screen;
    moving the portion of the at least one screen out of the gas duct, wherein said moving comprises rotating the screen in a continuous loop through a tank containing water or wash solution; and
    cleaning the portion of the at least one screen by removing at least a portion of the collected aerosols from the portion of the at least one screen.

* * * * *